May 22, 1956  N. O. HOLMSTEN  2,746,448
OVEN
Filed Jan. 9, 1952  3 Sheets-Sheet 1
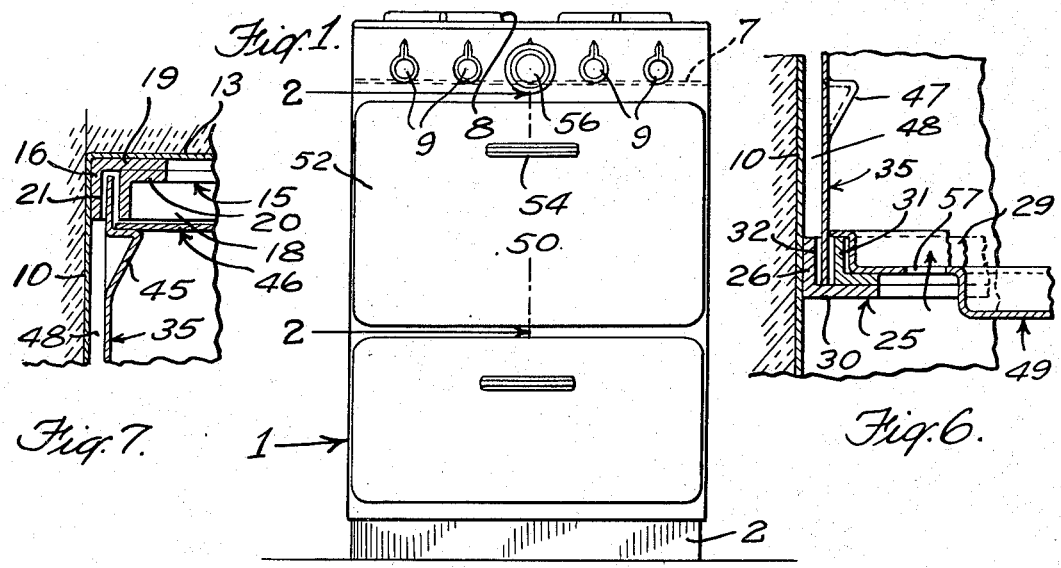
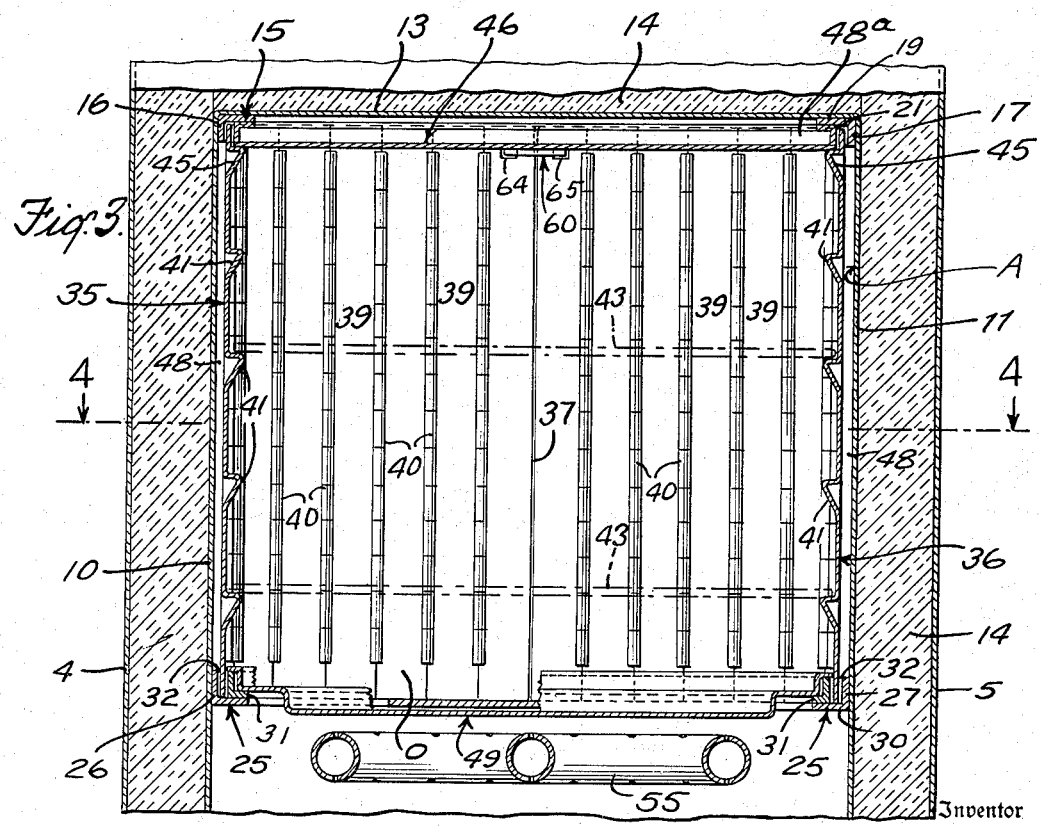
Inventor
NEIL O. HOLMSTEN
By
Attorney May 22, 1956 N. O. HOLMSTEN 2,746,448
OVEN
Filed Jan. 9, 1952 3 Sheets-Sheet 2
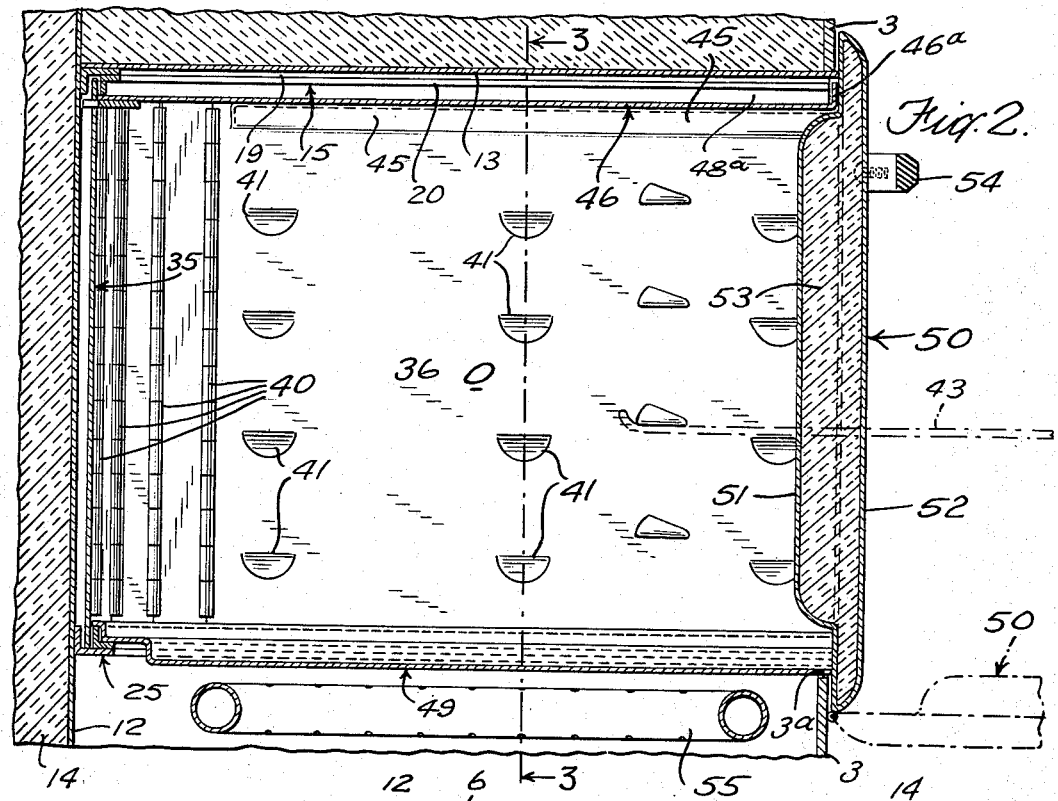
Fig. 2.
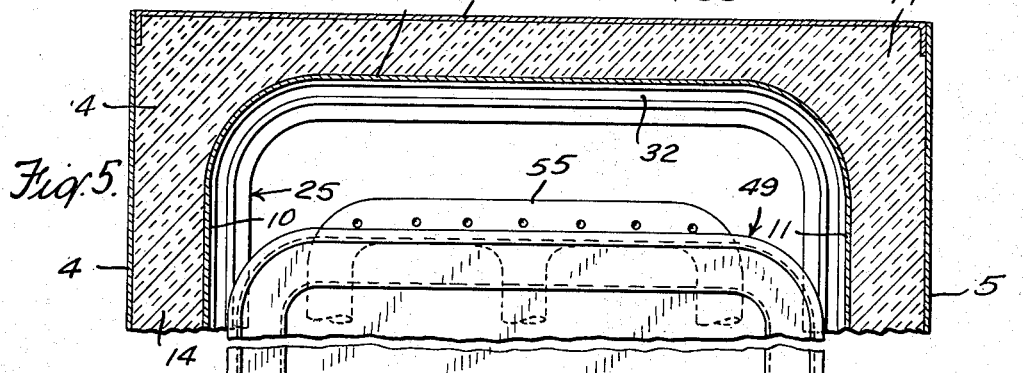
Fig. 5.
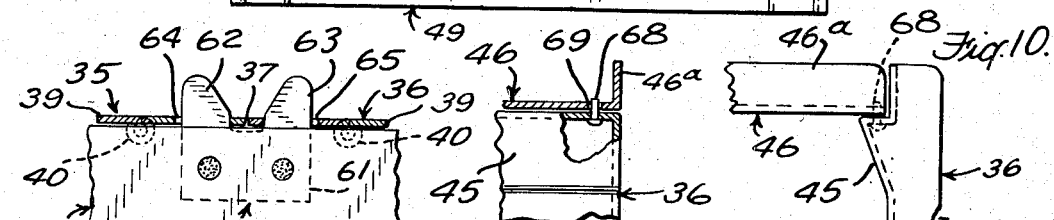
Fig. 8. Fig. 9. Fig. 10.
Inventor
NEIL O. HOLMSTEN
By
Attorney

United States Patent Office 2,746,448
Patented May 22, 1956

2,746,448

OVEN

Neil O. Holmsten, New Rochelle, N. Y.

Application January 9, 1952, Serial No. 265,652

13 Claims. (Cl. 126—19)

This invention relates generally to domestic cooking ranges using either gas or electricity as the heating medium. More specifically the invention relates to the construction of the oven in ranges of this type.

During roasting the walls of an oven are generally spattered with grease and smoke, and during the baking of pies and various casserole dishes there is frequently a spillage or overflowing from the utensils used onto the bottom and/or walls of the oven. In order to preserve the appearance and efficiency of an oven it should be thoroughly cleaned after each use as otherwise any foreign matter on the walls thereof will become so baked and hardened thereon that it will be practically impossible to remove it. In present day domestic ranges where the oven is always below the top burners or heating elements the cleaning of an oven is a very laborious and tedious task.

Having this in mind I have designed an oven for a domestic cooking range which is so constructed and arranged that the top, bottom, side and rear walls thereof can be quickly and easily removed and cleaned in the kitchen sink, or suitable receptacle, and after cleaning can be quickly and easily replaced in the range. In accordance with my invention I provide in a range top, bottom, side, rear and front walls which define an oven compartment. The front wall has an opening therein which is closed by a suitable door hinged to the range. Opposed upper and lower U-shaped supporting members are rigidly secured within the oven compartment. The upper supporting member extends rearwardly from the front wall along one side wall thence across the rear wall to the opposite side wall and then forwardly to the front wall adjacent the top of the opening in the front wall. The lower supporting member is similarly disposed adjacent the bottom of the opening in the front wall. These supporting members have vertically aligned opposed grooves forming tracks in which are slidably mounted a pair of opposed wall sections. The inner ends of these wall sections abut each other substantially midway between the compartment side walls. Each of these sections constitutes a side wall and a portion of the rear wall of an oven chamber within the oven compartment. These sections are made of sheet metal and at least the portion thereof which constitutes part of the back wall is flexible. This flexibility may be inherent in the metal or it may be secured by hinging together a plurality of narrow strips of sheet metal. The bottom wall of the oven chamber rests loosely upon the lower U-shaped supporting member and extends from side wall to side wall and from the rear wall of the oven chamber to the front wall of the oven compartment at the lower edge of the opening in the front wall of the oven compartment. The top wall of the oven chamber is slidably supported upon suitable means carried by the oven chamber side walls adjacent the upper edges thereof and extends between the oven chamber side walls and from the rear wall of oven chamber to the front wall of the oven compartment. The oven chamber side walls carry suitable means for removably supporting racks in selected positions. Interengaging means between the oven chamber top wall and the inner ends of the slidably mounted sections is provided to lock the sections in place against sliding movement until after the oven chamber top wall has been withdrawn. Releasable latching means is also provided to lock the oven chamber top wall in place.

In order to clean the oven chamber walls after use, the bottom wall is lifted out, and then the top wall is unlatched and slidably withdrawn. The removing of the top wall unlocks the two sections constituting the side and rear walls of the oven chamber after which they are slidably removed. After the removed wall sections have been cleaned, the side wall sections are first slid back into the grooved supporting members and then the top and bottom wall sections are replaced.

An added convenience with my improved oven construction is that the cleaning, scrubbing and washing can be eliminated completely by removing the walls, soaking same to dissolve the dirt, burnt crust, etc., then rinsing and replacing and heating slightly if necessary to dry same.

Other objects and advantages of the invention will be apparent from the following specification and the accompanying drawing forming a part thereof wherein:

Fig. 1 is a front elevation of a domestic cooking range embodying my improved oven construction;

Fig. 2 is an enlarged vertical section taken on the line 2—2 of Fig. 1;

Fig. 3 is a vertical section taken on the line 3—3 of Fig. 2;

Fig. 5 is a fragmentary horizontal section through the rear portion of the range showing the side and rear walls of the oven completely removed and the bottom wall partially removed;

Fig. 6 is an enlarged vertical detail section through one side wall and the lower supporting member;

Fig. 7 is a view similar to Fig. 6 through the upper supporting member;

Fig. 8 is an enlarged horizontal detail section showing the means for locking the side and rear walls against sliding movement.

Fig. 9 is an enlarged vertical detail section showing the latching means for locking the top wall in place;

Fig. 10 is an enlarged detail view in front elevation of the latching means shown in Fig. 9.

Figure 4:
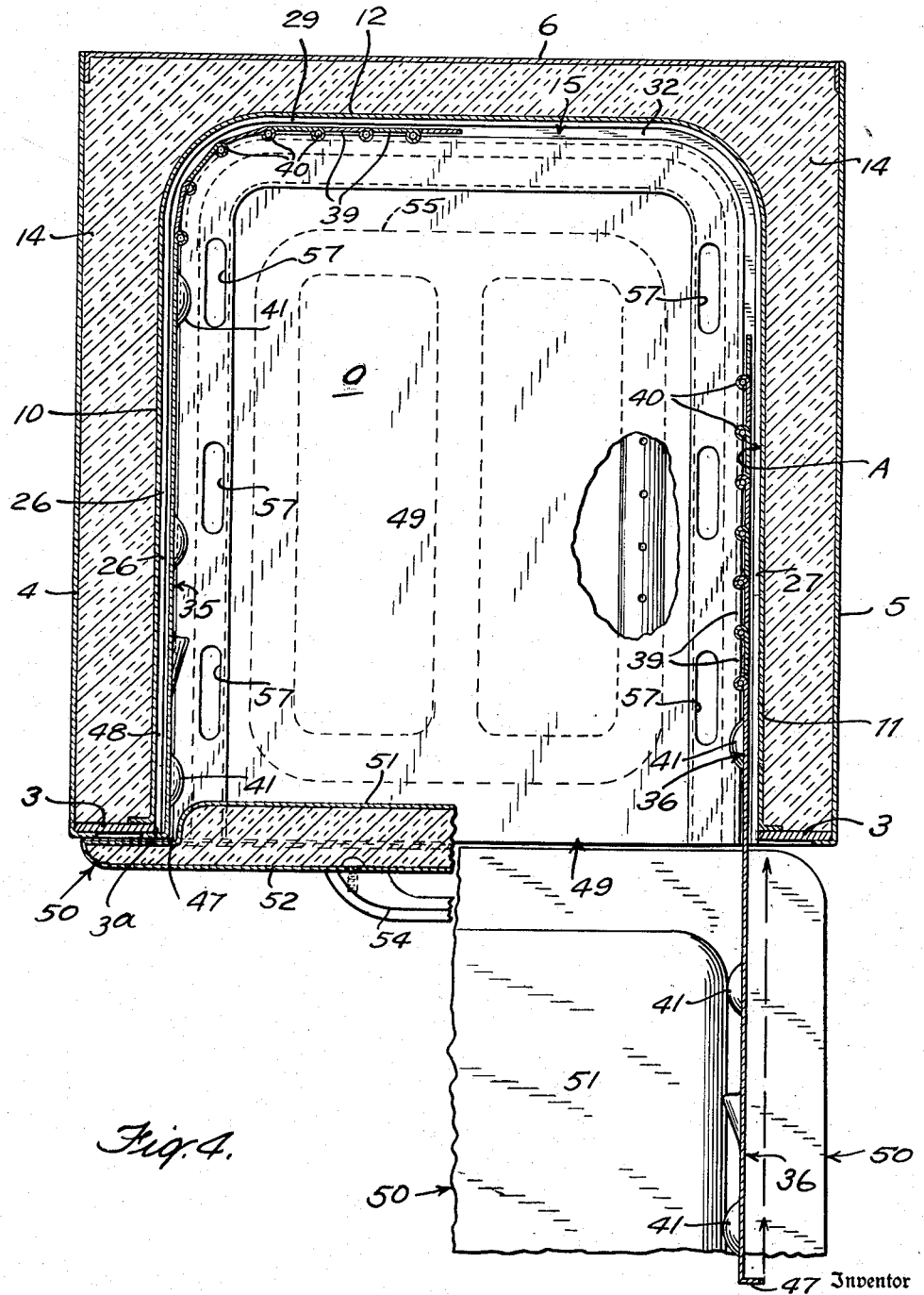
Fig. 4 is a horizontal section taken on the line 4—4 of Fig. 3 with one side of the view showing the oven door in open position and one side wall partially removed, and the other side of the view showing the oven door closed and the other side wall in normal position.

Referring now to the drawings by reference characters, the numeral 1 designates generally a domestic cooking range having my improved oven structure incorporated therein.

The range 1 comprises a base 2 having a pressed metal frame 3 secured thereto and extending upwardly from the forward edge thereof. Secured to and extending rearwardly from the frame 3 are side walls 4 and 5, which are connected together at the rear ends thereof by a rear wall 6. A top wall 7 is secured to and extends between the side walls 4 and 5 and the front and rear walls 3 and 6. Above the top wall 7 is provided a top burner compartment in which are mounted suitable top burners (not shown) below grates 8. The top burners are controlled by suitable valves (not shown) which are actuated by handles 9. The walls 3 to 7 constitute the outer shell of the range.

Secured to the frame 3 and extending rearwardly therefrom in spaced relation to the walls 4 and 5 are side walls 10 and 11 which are connected together at the rear ends thereof by a rear wall 12 which extends parallel to and in spaced relation to the outer wall 6. The walls 10, 11 and 12 are all connected together by a top wall 13 which is disposed in spaced relation to the wall 7. The walls 10, 11, 12 and 13 define an oven compartment A within the cooking range 1. The space between the compartment walls 10 to 13 and the wall defining the shell of the range is filled with suitable insulating material 14. The frame 3 which constitutes the front wall of the range has an enlarged rectangular opening 3a which extends from the inner face of the compartment side wall 10 to the inner face of the opposite compartment side wall 11, and from the inner face of the compartment top wall 13 downwardly. An upper U-shaped supporting member generally indicated by the numeral 15 is secured to the inner faces of the compartment walls 10, 11, 12 and 13, as clearly shown in Figs. 3 and 7. The supporting member 15 comprises the spaced parallel arms 16 and 17, the inner ends of which are connected together by a base 18. The member 15 is made up from two angle irons 19 and 20 which are welded together with the vertical legs thereof spaced from each other so as to provide a groove 21. The arm 16 is rigidly secured to the side wall and to the top wall 13, and the arm 17 is rigidly secured to the side wall 11 and to the top wall 13. The base is secured to the rear wall 12 and to the top wall 13. The forward or free ends of the arms 16 and 17 are disposed behind the opening 3a within the confines thereof so that the groove 21 will be accessible through the opening 3a as will be explained hereinafter. An opposed lower supporting member generally indicated by the numeral 25 having the arms 26 and 27 and the connecting base 19 is rigidly secured below the supporting member 15 within the compartment chamber A. The lower supporting member 25 is made up of the two angle irons 30 and 31 which have the vertical legs thereof spaced from each other to provide a groove 32 in opposed relation to the groove 21 in the upper supporting member 15. The arm 26 is rigidly secured to the inner face of the wall 10; the arm 27 is rigidly secured to the inner face of the wall 11, and the base 29 is secured to the rear wall 12. The forward free ends of the arms 26 and 27 are also disposed behind the opening 3a so that the groove 32 therein is accessible through this opening.

Two opposed similar sections 35 and 36 are slidably mounted in the grooves 21 and 32. The inner ends of the sections 35 and 36 abut each other as indicated at 37 midway between the walls 10 and 11. The section 35 constitutes one side wall and half of the back wall of an oven chamber O within the oven compartment; and the section 36 constitutes the other side wall and the balance of this oven chamber. The sections 35 and 36 are formed from sheet metal, and at least the portions thereof which constitute the rear wall of the oven chamber are flexible. This flexibility may be inherent in the sheet metal itself, or these sections may be made up of a plurality of narrow strips 39, which are connected together by suitable hinges 40. That portion of the sections 35 and 36 which constitute the side walls of the oven chamber have drawn bosses 41 for slidably supporting oven rack 43 in selected positions. Elongated supporting ledges 45 are also drawn from the side wall portions of the sections 35 and 36. A flat sheet metal plate 46 which constitutes the top wall of the oven chamber is slidably mounted upon the ledges 45, and extends between the oven chamber side walls and between the rear wall thereof and the front wall or frame 3 of the range. Top wall 46 can also be formed to conform to angle iron 20. The outer vertical edges of the sections 35 and 36 are flanged outwardly as shown at 47 to cover the vertical space 48 between the oven chamber walls and the compartment chamber walls, and the outer end of the top wall 46 is flanged upwardly at 46a to cover the horizontal space 48a between the top wall 46 of the oven chamber and the top wall 13 of the compartment chamber. A dished plate 49 which seats loosely upon the horizontal flange of the angle iron 31 of the lower U-shaped supporting member constitutes the bottom of the oven chamber O. The oven chamber O is closed by a suitable door 50 which is hinged to the frame 3 below the opening 3a therein. The oven door 50 comprises inner and outer spaced walls 51 and 52 which are suitably secured together around the periphery thereof. The space between the walls 51 and 52 is filled with insulating material 53. A handle 54 is provided for opening and closing the door. Although it is not shown herein, it will be understood that suitable counterbalancing means may be provided for the door 50. A burner 55 is mounted in any suitable manner in the oven compartment A below the bottom wall 49. The burner 55 is controlled by a suitable valve (not shown) which is actuated by the handle 56. Hot gases pass upwardly into the oven chamber O through slots 57 in the oven chamber bottom wall 49.

In order to lock the sections 35 and 36 in position against any movements in the grooves 21 and 32, I provide suitable latching means generally indicated by the numeral 60. The latching means 60 comprises a plate 61 which is secured to the under side of the top wall 46 at the rear edge thereof, as shown in Figs. 3 and 8. The plate 61 has a pair of spaced rearwardly extending tongues 62 and 63 which are adapted to engage slots 64 and 65 in the sections 35 and 36, respectively. In order to lock the top wall 46 in position, I provide projections 68 which are mounted upwardly from the supporting ledges 45 and engage notches 69 in the sides of the top wall 46. (Figs. 9 and 10.)

When it is desired to clean the oven after use, the forward end of the top wall 46 is raised slightly upwardly until the notches 69 are raised above and disengaged from the tongues 68, and then the wall 46 is slid forwardly out of the range. The removal of the top wall 46 withdraws the tongues 62 and 63 from the slots 64 and 65 in the oven chamber walls, thus releasing the sections 35 and 36 so that they may be slid outwardly in the grooves 21 and 32 and removed from the range. The bottom wall 49 can then be lifted from the supporting member 25. After removal, the wall sections of the oven chamber can be easily and thoroughly cleaned in the kitchen sink. After cleaning, the sections 35 and 36 are slid back into position in the grooves 21 and 32. The top wall 46 is then slid back into position upon the supports 45. When the top wall is fully inserted, the tongues 62 and 63 of the latch 60 will again engage the slots 64 and 65 and lock the sections 35 and 36 against removal; and the notches 69 will engage the tongues 68 thus latching the top wall 46 against removal. The bottom wall 49 can then be inserted into the oven chamber upon the lower supporting member 25. The oven is now completely reassembled and ready for the next use.

It is obvious that the flexible portion forming the rear wall may be disposed entirely on one side wall or on the bottom or top wall if desired or partly on any two opposite walls. Also the flexible wall sections may be joined by links which provide the necessary flexibility. The frame or the walls may have suitable openings or indentations for the insertion of a tool or fingers to facilitate removal. An electric light (not shown) may be disposed outside of the removable walls to show in the oven through a window of heat resistant glass. A thermostatic heating element or other control devices may be disposed in the space between the movable and fixed walls.

With this construction it is evident that all of the wall members forming the oven closure may be removed for cleaning and may be readily replaced as desired.

It is to be understood that I am not limited to the specific construction shown and described herein as various modifications may be made therein as will be apparent to a person skilled in the art.

What is claimed is:

1. A cooking range having an oven compartment therein, opposed tracks within said compartment to receive sliding walls, a pair of metal wall sections slidably supported in said tracks, at least a portion of one of said wall sections being flexible, said sections constituting opposite walls and the back wall of an oven chamber within said compartment, and a pair of other wall sections removably supported between said first walls to form an open front oven chamber.

2. The combination set forth in claim 1 in which said flexible wall comprises a plurality of rigid sections joined together by links.

3. A cooking range having an oven compartment therein, opposed supporting members rigidly secured within said compartment, a pair of elongated metal sections slidably supported by said supporting members, at least a portion of each of said sections being flexible, one of said sections constituting one longitudinal wall and a portion of the back wall of an oven chamber within said compartment and the other of said sections constituting the opposite longitudinal wall and the balance of the back wall of said oven chamber, a second pair of longitudinal walls removably supported between said first longitudinal walls to form an open front oven chamber, and interengaging means between said last pair of walls and said back wall to lock said sections in position against sliding movement.

4. A cooking range having an oven compartment therein, opposed upper and lower supporting members rigidly secured within said compartment, a pair of similar elongated metal sections slidably supported by said supporting members, at least a portion of each of said sections being flexible, one of said sections constituting one side wall and a portion of the back wall of an oven chamber within said compartment and the other of said sections constituting the other side wall and the balance of the back wall of said oven chamber, an oven bottom removably supported between said side walls adjacent the lower edges thereof, and an oven top wall removably supported between said side walls adjacent the upper edges thereof.

5. A cooking range having an oven compartment therein, opposed upper and lower supporting members rigidly secured within said compartment, a pair of similar elongated metal sections slidably supported by said supporting members, at least a portion of each of said sections being flexible, one of said sections constituting one side wall and a portion of the back wall of an oven chamber within said compartment and the other of said sections constituting the other side wall and the balance of the back wall of said oven chamber, an oven bottom removably supported between said side walls adjacent the lower edges thereof, an oven top wall removably supported between said side walls adjacent the upper edges thereof, and interengaging means between said sections and said top wall by which said sections are locked in position against movement.

6. A cooking range having an oven compartment therein, opposed upper and lower supporting members rigidly secured within said compartment, a pair of similar elongated metal sections slidably supported by said supporting members, at least a portion of each of said sections being flexible, one of said sections constituting one side wall and a portion of the back wall of an oven chamber within said compartment and the other of said sections constituting the other side wall and the balance of the back wall of said oven chamber, an oven bottom removably supported between said side walls adjacent the lower edges thereof, an oven top wall removably supported between said side walls adjacent the upper edges thereof, and interengaging means between said sections and said top wall by which said sections are locked in position against sliding movement.

7. A cooking range having an oven compartment therein, opposed upper and lower supporting members rigidly secured within said compartment, a pair of similar elongated metal sections slidably supported by said supporting members, at least a portion of each of said sections being flexible, one of said sections constituting one side wall and a portion of the back wall of an oven chamber within said compartment and the other of said sections constituting the other side wall and the balance of the back wall of said oven chamber, an oven bottom removably supported between said side walls adjacent the lower edges thereof, an oven top wall removably supported between said side walls adjacent the upper edges thereof, interengaging means between said sections and said top wall by which said sections are locked in position against sliding movement, and latching means by which said top wall is locked in position.

8. A cooking range having an oven compartment therein, opposed upper and lower supporting members rigidly secured within said compartment, a pair of similar elongated metal sections slidably supported by said supporting members, at least a portion of each of said sections being flexible, one of said sections constituting one side wall and a portion of the back wall of an oven chamber within said compartment and the other of said sections constituting the other side wall and the balance of the back wall of said oven chamber, an oven bottom removably mounted upon said lower supporting member and extending between said side walls, and an oven top wall removably supported adjacent the upper edges of said side walls and extending therebetween.

9. A cooking range having an oven compartment therein, opposed upper and lower supporting members rigidly secured within said compartment, a pair of similar elongated metal sections slidably supported by said supporting members, at least a portion of each of said sections being flexible, one of said sections constituting one side wall and a portion of the back wall of an oven chamber within said compartment and the other of said sections constituting the other side wall and the balance of the back wall of said oven chamber, an oven bottom removably supported between said side walls adjacent the lower edges thereof, and an oven top wall slidably mounted upon supporting means carried by said sections adjacent the upper edges thereof.

10. A cooking range having an oven compartment therein, opposed upper and lower supporting members rigidly secured within said compartment, a pair of similar elongated metal sections slidably supported by said supporting members, at least a portion of each of said sections being flexible, one of said sections constituting one side wall and a portion of the back wall of an oven chamber within said compartment and the other of said sections constituting the other side wall and the balance of the back wall of said oven chamber, an oven bottom removably mounted upon said lower supporting member and extending between said side walls, and an oven top wall slidably mounted upon supporting means carried by said sections adjacent the upper edges thereof.

11. A cooking range as defined in claim 5 in which said interengaging means comprises prongs on said top wall entering recesses in said back wall to lock said sections in position against removal.

12. A cooking range as defined in claim 1 in which said flexible portion comprises a series of rigid strips hinged together to flex to pass around the back corner of said chamber.

13. A cooking range as set forth in claim 12 in which the hinge means constitute a substantially closed seal between hinged strips.

References Cited in the file of this patent
UNITED STATES PATENTS

| Number | Name | Date |
|---|---|---|
| 538,430 | McKenzie | Apr. 30, 1895 |
| 1,872,020 | Taylor | Aug. 16, 1932 |
| 1,969,197 | Barker | Aug. 7, 1934 |
| 1,979,210 | Rogers | Oct. 30, 1934 |
| 2,252,139 | Schlacter | Aug. 12, 1941 |
| 2,520,133 | Donovan | Aug. 29, 1950 |
| 2,555,841 | Clark | June 5, 1951 |
| 2,584,874 | Haas | Feb. 5, 1952 |